US008490517B2

(12) United States Patent
MacArthur et al.

(10) Patent No.: US 8,490,517 B2
(45) Date of Patent: Jul. 23, 2013

(54) HOLD AND DRIVE DEVICE

(75) Inventors: Benjamin MacArthur, Barrie (CA); Vaughn Bosley, Alliston (CA)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/414,761

(22) Filed: Mar. 8, 2012

(65) Prior Publication Data

US 2012/0200016 A1 Aug. 9, 2012

Related U.S. Application Data

(62) Division of application No. 12/396,059, filed on Mar. 2, 2009, now Pat. No. 8,156,844.

(30) Foreign Application Priority Data

Oct. 22, 2008 (CA) ...................................... 2641518

(51) Int. Cl.
*B25B 13/48* (2006.01)
*B23P 11/00* (2006.01)

(52) U.S. Cl.
USPC ............................................ 81/55; 29/525.02

(58) Field of Classification Search
USPC ................. 81/55, 185.2, 9.24, 429; 29/897.2, 29/525.02, 525.11; 173/1, 11, 13, 18
See application file for complete search history.

(56) References Cited

U.S. PATENT DOCUMENTS

| | | | | |
|---|---|---|---|---|
| 1,261,006 | A | | 4/1918 | Bartelt |
| 1,390,071 | A | | 9/1921 | Wetzstein |
| 1,550,436 | A | | 8/1925 | Hall |
| 2,007,432 | A | | 7/1935 | Mancuso |
| 2,570,230 | A | | 12/1946 | Hammond |
| 2,544,834 | A | | 3/1951 | Hancock |
| 3,027,789 | A | * | 4/1962 | Bochman, Jr. .................... 81/56 |
| 3,584,527 | A | | 6/1971 | Bosten |
| 3,818,211 | A | | 6/1974 | Wilfert et al. |
| 3,889,558 | A | * | 6/1975 | Duncan ............................. 81/55 |
| 3,960,039 | A | | 6/1976 | Nash et al. |

(Continued)

FOREIGN PATENT DOCUMENTS

JP 2122182 5/1990

OTHER PUBLICATIONS

Canadian Intellectual Property Office Examination Report dated Apr. 30, 2009.
Snap-on Technologies, Inc., Catalog 600; ST669 (Jul. 2001).

(Continued)

*Primary Examiner* — Hadi Shakeri
(74) *Attorney, Agent, or Firm* — Rankin, Hill & Clark LLP

(57) ABSTRACT

A method of driving a nut on a bolt comprising using a motorized socket drive tool having an open drive socket located in a drive head portion, is provided. A support assembly having a spring loaded biasing portion configured for travel along a torque arrest path, where a torque arrest member is coupled with the spring loaded biasing portion in an operative position, is provided in a coupled arrangement with the motorized socket drive tool. The open drive socket is directed to pass over the nut and the torque arrest member is directed to engage the bolt such that the open drive socket may drive the target nut, while the torque arrest member holds the bolt from rotation. The open drive socket and torque arrest member are respectively released from the nut and the bolt after the nut reaches a predetermined destination on the bolt.

3 Claims, 3 Drawing Sheets

U.S. PATENT DOCUMENTS

| | | | |
|---|---|---|---|
| 3,988,925 | A | 11/1976 | Seccombe et al. |
| 4,121,444 | A | 10/1978 | Duran |
| 4,287,795 | A | 9/1981 | Curtiss |
| 4,688,454 | A | 8/1987 | Scull |
| 4,735,118 | A | 4/1988 | Broemel, Jr. |
| 5,305,666 | A | 4/1994 | LaTorre |
| 5,553,519 | A | 9/1996 | Pettit, Jr. |
| 5,699,702 | A | 12/1997 | Myers |
| 5,778,741 | A | 7/1998 | Batten |
| 6,189,416 | B1 | 2/2001 | Groom |
| 6,490,952 | B2 | 12/2002 | Junkers |
| 6,935,209 | B2 | 8/2005 | Lantow et al. |
| 6,959,625 | B2 | 11/2005 | Pettit, Jr. |
| 7,287,447 | B2 | 10/2007 | Pettit, Jr. |

OTHER PUBLICATIONS

Examiner's Report of Canadian Serial No. 2,575,701 dated Sep. 19, 2011.

* cited by examiner

HOLD AND DRIVE DEVICE

REFERENCE TO RELATED APPLICATION

The present application is a Divisional of U.S. patent application Ser. No. 12/396,059, filed Mar. 2, 2009, entitled "HOLD AND DRIVE DEVICE" and assigned U.S. PATENT APPLICATION Number US2010-0095810-A1, which in turn claims priority to Canadian Patent Application serial number 2,641,518, filed Oct. 22, 2008, the entire contents of which are incorporated herein by reference.

FIELD OF THE INVENTION

The present invention relates to tools and methods for the assembly of parts and/or other components.

DESCRIPTION OF THE RELATED ART

Assembly of articles sometimes involves tools known as "hold and drive" tools. These tools provide a plunger, centrally located in a socket. The plunger usually includes an Allen key and serves to arrest a target bolt from turning while the hold and drive tool is used to drive a target nut on the so-arrested target bolt.

Conventional hold and drive tools tend to be relatively heavy and, if not heavy, relatively fragile, requiring frequent repair. Tool failures are common and many spare parts are usually required. To ensure continuity of operations, in some cases, as many as three backup tools are required as contingency in case of tool failure. Thus, conventional hold and drive tools can have, in some cases, a relatively high repair cost.

Conventional hold and drive tools are also known to require the Associates to hold down the plunger with one hand in order to keep the Allen key engaged to the target bolt, all the while gripping the tool to drive the socket with the other. This requires the use of both hands and increases the risk of injury due to poor ergonomics as a result.

Thus, it would be desirable to provide a novel or alternative tool and/or method to approach this task.

SUMMARY OF THE GENERAL INVENTIVE CONCEPT

In an exemplary embodiment, there is provided a socket driving device, comprising a drive head portion and a hand-grippable drive body portion operatively coupled with the drive head portion. The drive head portion includes a socket portion for driving a target nut, the drive head portion having a pair of opposed surfaces adjacent the socket portion. The socket portion includes a central fastener-receiving passage therein with a central socket axis, the central fastener-receiving passage being exposed through both opposed surfaces. A key portion is provided for engaging a target bolt on which the target nut is to be driven by the socket portion, a key support assembly for positioning the key portion in an operative position relative to the socket portion. The key support assembly includes a support frame secured to the drive body portion and/or the drive head portion. The support frame includes a support arm portion extending along the drive head portion, the support arm having a free end region, the key portion being held relative to the free end region and in the operative position relative to the socket axis, the key portion being biased toward the socket portion.

In an exemplary embodiment, the drive body portion includes a neck portion, the support frame including a first collar portion engaged with the neck portion and coupled with the support arm portion. The support frame includes a second collar portion formed adjacent the free end region.

An exemplary embodiment further comprises a cylinder held within the second collar portion, a piston slidably mounted in the cylinder for travelling along an axis parallel with the socket axis, the piston being movable between an extended position and a retracted position. The cylinder may have at least one slot, with the piston portion having a cross member, the cross member having at least one end region engaged with the slot.

An exemplary embodiment further comprises a biasing member held within the cylinder for biasing the key portion toward the extended position. The first collar portion may include a first body and a first saddle member coupled therewith for engaging the neck portion between the first body and the first saddle member. The first collar portion and the support arm portion may thus form a length adjustable joint.

In an exemplary embodiment, the second collar portion includes a second body and a second saddle member is coupled therewith for engaging the neck portion between the first body and the second saddle member. The piston portion may in this case be tubular, with the key portion nested within the piston portion.

In another exemplary embodiment, there is provided a socket driving device, comprising a head, a neck supporting the head and a hand-grippable driving portion coupled with the head through the neck, the head including a socket portion for driving a target nut. The head has a pair of opposed surfaces adjacent the socket portion. The socket includes a central fastener-receiving passage therein having a central socket axis and which is exposed through both said opposed surfaces. A key portion is provided for engaging a target bolt on which the target nut is to be threadably mounted, while a key support assembly is provided for positioning the key portion in an operative position relative to the socket portion. The key support assembly includes a support frame secured to the neck while the support frame includes a first collar portion engaged with the neck and a support arm portion extending from the collar portion along the head. The support arm has a free end region, a second collar portion is located near the free end region and a cylinder held within the second collar portion. A piston is slidably mounted in the cylinder for travelling along an axis parallel with the socket axis.

In an exemplary embodiment, the collar portion is movable between an extended position and a retracted position. The cylinder may have a pair of opposed slots, the piston portion having a cross member, the cross member having opposed end regions, each engaged with a corresponding slot.

An exemplary embodiment further comprises a biasing member held within the cylinder for biasing the key portion toward the extended position.

In an exemplary embodiment, the first collar portion and the support arm portion form a length adjustable joint. The piston portion may be tubular, with the key portion nested within the piston portion.

In another exemplary embodiment, there is provided a method of driving a target nut on a target bolt. The method comprises providing a motorized socket drive tool with a drive head portion and an open drive socket located in the drive head portion, providing a support assembly in a coupling with the motorized socket drive tool and with a spring loaded biasing portion which is configured to travel along a torque arrest path, providing a torque arrest member in a coupling with the spring loaded biasing portion and in an operative position adjacent a first side of the open drive socket to engage a free end of the target bolt, directing the motorized socket drive tool to pass a second side of the open socket over the target nut, directing the torque arrest member to engage the target bolt, and activating the motorized socket drive tool to drive the target nut, while the target bolt passes from the second side of the open socket through the open socket and to the first side thereof and while the torque arrest member correspondingly travels along the torque arrest path; and releasing the open socket and torque arrest member respectively from the target nut and target bolt after the target nut reaches a predetermined destination on the target bolt.

In another exemplary embodiment, there is provided a nut and bolt arrangement formed by one or more of the above mentioned embodiments.

In another exemplary embodiment, there is provided a method of installing a shock absorber assembly in a vehicle. The method includes providing a vehicle frame with an anchor flange, which configured to receive a target bolt portion emerging from one end of a shock absorber assembly, and inserting the target bolt portion through the anchor flange and driving a target nut on the target bolt according to the one or more of the above mentioned embodiments.

In another exemplary embodiment, there is provided a vehicle, comprising a plurality of shock assemblies, one or more of which being installed according to one or more of the above mentioned embodiments In yet another exemplary embodiment, there is provided a method of installing a component in a vehicle. The method comprises providing a vehicle frame with an anchor location, which is configured to receive a target bolt portion emerging from a component, inserting the target bolt portion through the anchor location and driving a target nut on the target bolt according to one or more of the above mentioned embodiments.

In yet another exemplary embodiment, there is provided a vehicle, comprising at least one component, installed according to one or more of the above mentioned embodiments.

BRIEF DESCRIPTION OF THE DRAWINGS

Several exemplary embodiments of the present invention will be provided, by way of examples only, with reference to the appended drawings, wherein.

DESCRIPTION OF THE EXEMPLARY EMBODIMENTS

Figure 1:
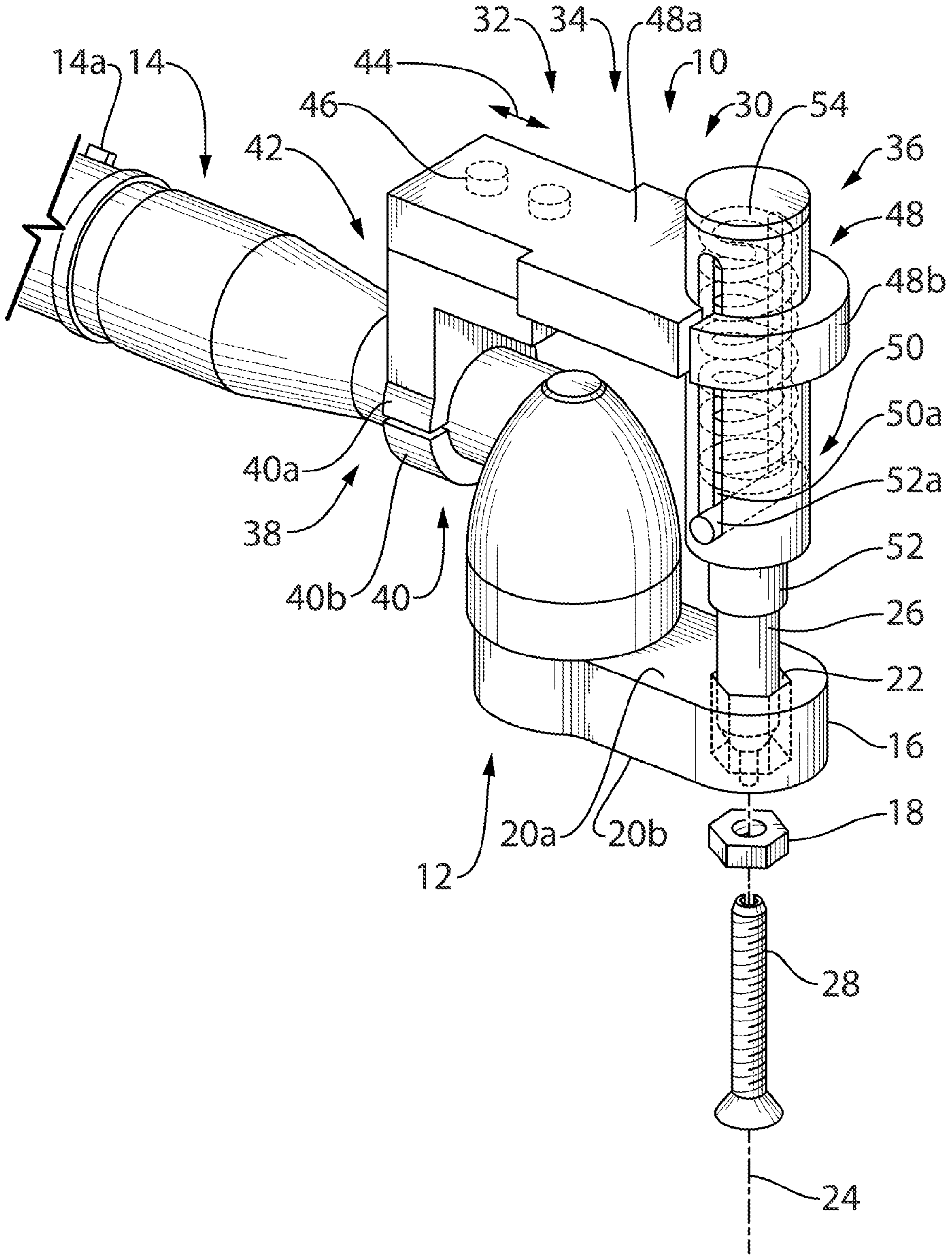
FIG. 1 is a fragmentary perspective view of a hold and drive tool.

It should be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Furthermore, and as described in subsequent paragraphs, the specific mechanical configurations illustrated in the drawings are intended to exemplify embodiments of the invention. However, other alternative mechanical configurations are possible which are considered to be within the teachings of the instant disclosure. Furthermore, unless otherwise indicated, the term "or" is to be considered inclusive.

Referring to the figures, there is provided a socket driving device 10, having a drive head portion 12 and a hand-grippable drive body portion 14 operatively coupled with the drive head portion 12.

The drive head portion 12 includes a socket portion 16 for driving a target nut 18, along with a pair of opposed surfaces 20*a*, 20*b* adjacent the socket portion 16.

The socket portion 16 includes a central target bolt-receiving passage 22 therein with a central socket axis 24. The central target bolt-receiving passage 22 is exposed through both opposed surfaces 20*a*, 20*b*. A key portion 26 is also provided for engaging a target bolt 28 on which the target nut is to be driven by the socket portion, as will be described.

A key support assembly 30 positions the key portion 26 in an operative position relative to the socket portion 16. The key support assembly 30 includes a support frame 32 secured to the drive body portion 14 and/or the drive head portion 12, as will be described. The support frame 32 includes a support arm portion 34 extending along the drive head portion 12. The support arm portion 34 has a free end region 36. The key portion 26, in this case, is held relative to the free end region 36 and in the operative position relative to the socket axis 24. Further, the key portion 26 is biased toward the socket portion 16. More particularly, in this example, the key portion 26 is centrally located relative to and substantially parallel with the socket axis 24.

It will be seen that the drive body portion 14 includes a neck portion 38 that supports the drive head portion 12. The drive head portion 12, the drive body portion 14 and the neck portion 38 are configured in what is referred to as a "crow foot" type tool and the key support assembly 30 thus provides a hold and drive adaptor which is especially useful for converting a crow foot type tool into a hold and drive tool.

The support frame 32 includes a first collar portion 40 engaged with the neck portion 38 and coupled with the support arm portion 34. In this case, the first collar portion 40 and the support arm portion 34 form a length-adjustable joint 42 and are held by fasteners shown schematically at 46.

The support frame includes a second collar portion 48 formed adjacent the free end region 36. A cylinder 50 is held within the second collar portion 48, while a piston 52 is slidably mounted in the cylinder 50 for travelling along an axis parallel with the socket axis 24. The piston 52 is movable between an extended position, shown in FIG. 1, and a retracted position.

The cylinder 50 has at least one slot 50*a* and the piston 52 has a cross member 52*a*, with at least one end region which is engaged with the slot 50*a*. Further, it can be see that the piston 52 is tubular and the key portion 26 is held in a nested configuration within the piston 52, though the key portion may be integrally formed with the piston 52 as desired.

A biasing member, in this case in the form of a compression spring 54, is held within the cylinder 50 for biasing the key portion 26 toward the extended position.

The first collar portion 40 includes a first body 40*a* and a first saddle member 40*b* which is coupled to or integrally formed with the first body 40*a* for engaging the neck portion 38 between the first body 40*a* and the first saddle member 40*b*.

The second collar portion 48 similarly includes a second body 48*a* and a second saddle member 48*b* which is coupled to or integrally formed with the first body 48*a* for engaging the cylinder 50 between the first body 48*a* and the second saddle member 48*b*.

The device 10 may be used, for example, in a method of driving a target nut on a target bolt, by providing a motorized socket drive tool with a drive head portion and an open drive socket located in the drive head portion; and providing a support assembly in a coupling with the motorized socket drive tool and with a spring loaded biasing portion which is configured to travel along a torque arrest path. The method may then involve providing a torque arrest member in a coupling with the spring loaded biasing portion and in an operative position adjacent a first side of the open drive socket to engage a free end of the target bolt, and directing the motorized socket drive tool to pass a second side of the open socket on the target nut. Next, the torque arrest member may be directed to engage the target bolt, and the motorized socket drive tool may be activated to drive the target nut, while the target bolt passes from the second side of the open socket, through the open socket and to the first side thereof and while the torque arrest member correspondingly travels along the torque arrest path. The open socket and torque arrest member may then be released from the target nut and target bolt respectively after the target nut reaches a predetermined destination on the target bolt.

Figure 4:
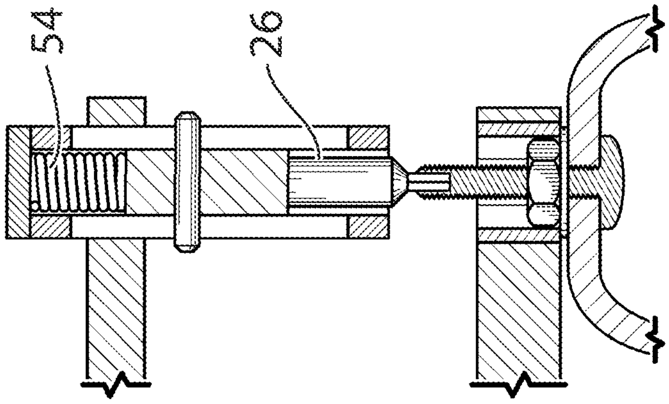
FIGS. 2, 3 and 4 are fragmentary sectional operational views of the tool of FIG. 1.
Figure 3:
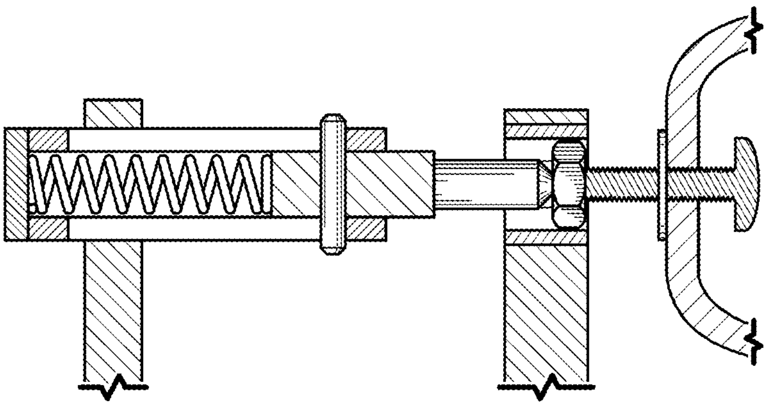
Figure 2:
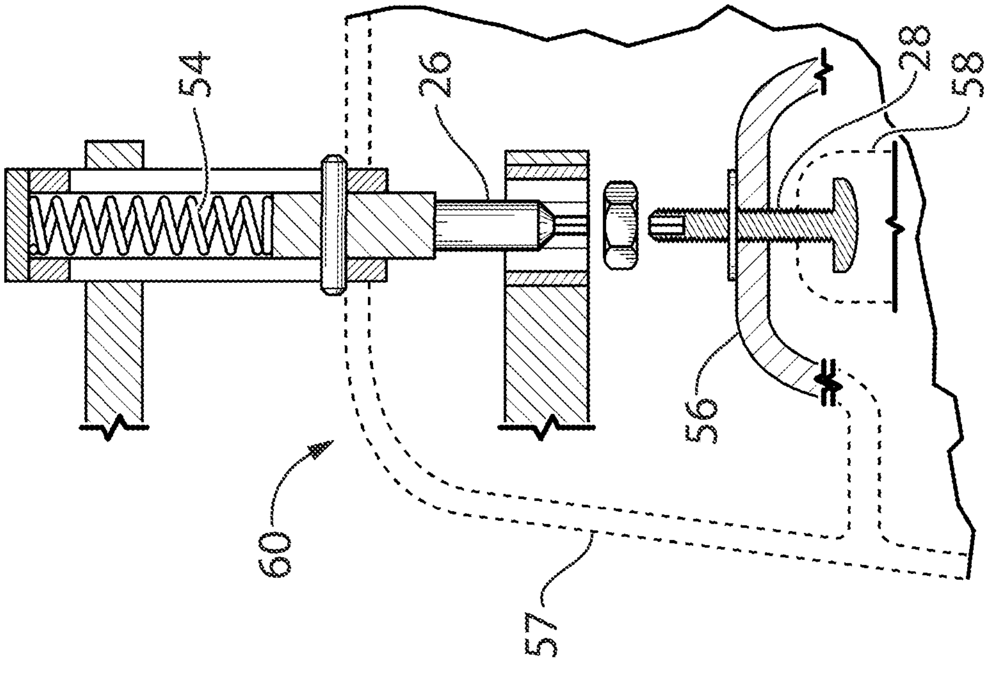

Referring to FIGS. 2, 3 and 4, the device may be used as follows. First, the cylinder 50 is placed in the second collar portion 48 and secured therein. Next, a key portion 26 may be selected according to the target-bolt 28 and inserted in or otherwise held by the piston 52. Next, the key support assembly 30 may be mounted on the neck portion 38 by placing the first collar portion 40 in an operative position around the neck portion 38. Meanwhile, the support arm portion 34 may be oriented so that the key portion 26 is aligned with the socket axis 24. This may involve adjustments at the first collar portion that is by selecting a position along the region of the neck portion 38, or by adjusting the position of the support arm portion 34 relative to the first collar portion 40 at the joint 42. In this case, the target bolt 28 is seen to extend through an anchor flange 56, which in one example is located on a vehicle frame 57 to serve as an anchor bracket for a shock absorber assembly in a vehicle identified at 60. Of course, it follows that the shock absorber assembly 58 is otherwise installed on another portion of the vehicle, in a manner that is not described here, for the sake of brevity.

Figure 5:
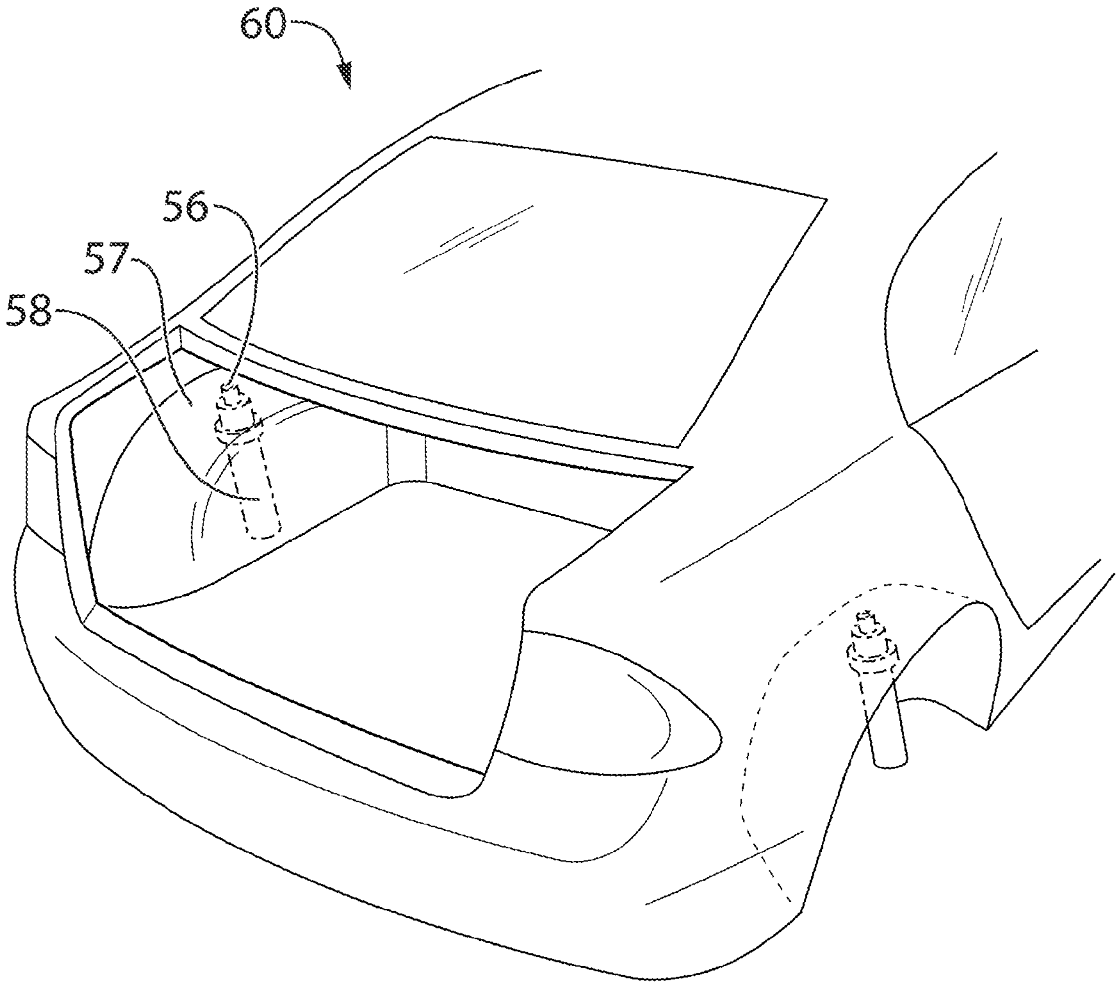
FIG. 5 is a schematic view of a portion of a vehicle.

Thus, in this case, the device 10 may be used in a further method of installing one or more vehicle components or parts, such as a shock absorber assembly, in a vehicle or other article. This may be done by providing the vehicle frame 57 with the anchor flange 56 which is configured to receive the target bolt, in the form of a target bolt portion emerging from one end of the shock absorber assembly 58. Next, the target bolt portion is extended through the through the anchor flange and the target nut is then driven on the target bolt as discussed hereinabove. This method may then be used in the assembly of one or more shock absorber assemblies in the vehicle, as shown in FIG. 5.

The cylinder 50 may be adjusted so that it is at the correct elevation relative to the second collar portion 48 so that the key portion 26 is itself in the correct position with the piston 52 in the extended position under the biasing force of the compression spring 54.

The Associate may then orient to the device 10 to line up the key portion 26 with a recess in the outer end face of the target bolt 28 to match, or to be complementary with, the key portion 26 and then engage the socket portion 16 with a target nut 18. The Associate may then activate the drive body portion 14 by a trigger shown at 14*a*. This causes the socket portion 16 to torque the target nut 18 on the target bolt 28, while the latter is held by the key portion 26 under the biasing force of the compression spring 54. The Associate may carry out these steps with a single arm, leaving his remaining arm for balancing and maintaining a safe orientation.

Thus, the device 10 provides a key support assembly which may be attached to, or formed integrally with, the neck of a crow foot tool, or for that matter other tools providing a functionally equivalent or similar drive head portion as provided on the device 10, to clamp a base which extends along the tool toward the drive head portion and which terminates at or near a passage to receive a spring loaded piston-cylinder arrangement. A cross pin travels in one or more slots along the cylinder to prevent rotation of the piston to provide a reasonably rugged structure which may be well suited for an assembly line environment.

Thus, the device 10 may be formed from materials making it light weight and robust. The key support assembly provides a structure which may be provided separately as an adaptor and arranged to attach to a crow foot type tool which is known to be rugged and reliable, though the adaptor may be utilized on other tools in some cases. The device does not require the Associate to hold down a plunger, providing instead a spring loaded piston cylinder arrangement to downwardly bias an Allen key when the device is gripped to engage the target nut with the socket portion. The device may be configured to fit a range of crow foot tools, both in DC electric or pneumatic models, as desired. The cylinder and piston arrangement may be considered to be a chamber and plunger arrangement, with the plunger housing a 5 mm Allen key, for instance, though other dimensions may also be used as desired, depending of course on the dimensions of the target bolt. Other tool portions, other than Allen keys, may also be used for this function as desired.

While the present invention has been described for what are presently considered the preferred embodiments, the invention is not so limited. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

The invention claimed is:

1. A method of driving a target nut on a target bolt, comprising providing a motorized socket drive tool with a drive head portion and an open drive socket located in the drive head portion, providing a support assembly coupled with the motorized socket drive tool for holding a cylinder, the cylinder being vertically adjustable within the support assembly relative the open drive socket, providing a non-rotatable torque arrest member in the cylinder outwardly biased toward an open end of the cylinder by a spring loaded biasing portion held within the cylinder and configured for travel along a torque arrest path, adjusting the height of the cylinder so as to be in an operative position adjacent a first side of the open drive socket, directing the motorized socket drive tool to pass a second side of the open socket over the target nut, directing the non-rotatable torque arrest member to engage a free end of the target bolt, and activating the motorized socket drive tool to drive the target nut, while the target bolt passes from the second side of the open socket through the open socket and to the first side thereof and while the non-rotatable torque arrest member correspondingly travels along the torque arrest path compressing the spring-loaded biasing portion; and releasing the open socket and torque arrest member respectively from the target nut and target bolt after the target nut reaches a predetermined destination on the target bolt.

2. A method of installing a component in a vehicle, comprising providing a vehicle frame with an anchor location, configured to receive a target bolt portion emerging from a component, inserting the target bolt portion through the anchor location and driving a target nut on the target bolt, driving the target nut on the target bolt further comprising providing a motorized socket drive tool with a drive head portion and an open drive socket located in the drive head portion, providing a support assembly coupled with the motorized socket drive tool for holding a cylinder, the cylinder being vertically adjustable within the support assembly relative the open drive socket, providing a non-rotatable torque arrest member in the cylinder outwardly biased toward an open end of the cylinder by a spring loaded biasing portion held within the cylinder and configured for travel along a torque arrest path, adjusting the height of the cylinder so as to be in an operative position adjacent a first side of the open drive socket, directing the motorized socket drive tool to pass a second side of the open socket over the target nut, directing the non-rotatable torque arrest member to engage a free end of the target bolt, and activating the motorized socket drive tool to drive the target nut, while the target bolt passes from the second side of the open socket through the open socket and to the first side thereof and while the non-rotatable torque arrest member correspondingly travels along the torque arrest path compressing the spring-loaded biasing portion; and releasing the open socket and torque arrest member respectively from the target nut and target bolt after the target nut reaches a predetermined destination on the target bolt.

3. A method of installing a component in a vehicle as defined in claim 2, the component including a shock absorber assembly.

* * * * *